United States Patent
Hingne et al.

(10) Patent No.: US 9,499,034 B1
(45) Date of Patent: Nov. 22, 2016

(54) VEHICLE CANOPY

(71) Applicant: Deere & Company, Moline, IL (US)

(72) Inventors: Abhijeet Hingne, Khamgaon (IN); Frederick W. Nelson, Waukee, IA (US); Donald L. Goodrich, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/732,888

(22) Filed: Jun. 8, 2015

(51) Int. Cl.
*B60J 7/12* (2006.01)
*B60R 11/02* (2006.01)
*B62D 33/06* (2006.01)

(52) U.S. Cl.
CPC .............. *B60J 7/12* (2013.01); *B60R 11/0258* (2013.01); *B62D 33/0621* (2013.01)

(58) Field of Classification Search
CPC .......... B60J 7/12; B60J 7/1226; B60J 7/1295; B62D 25/06; B62D 33/0617; B62D 33/0621; B62D 33/0625
USPC ............ 296/102, 104, 105, 109, 107.09, 116
See application file for complete search history.

(56) References Cited

U.S. PATENT DOCUMENTS

| | | | | |
|---|---|---|---|---|
| 218,115 A * | 8/1879 | Clark | ..................... | B60J 7/1295 296/99.1 |
| 1,360,407 A * | 11/1920 | Hughes | .............. | B62D 33/0625 296/102 |
| 1,716,212 A * | 6/1929 | Cushman | ........... | B62D 33/0617 296/102 |
| 2,682,427 A * | 6/1954 | Bright | .................... | B60J 5/0487 135/117 |
| 3,205,003 A * | 9/1965 | Jensen | ............... | B62D 33/0625 296/102 |
| 3,622,177 A * | 11/1971 | Notestine | ................ | B60R 21/13 280/756 |
| 5,882,063 A | 3/1999 | Job | | |
| 6,059,351 A * | 5/2000 | Ehnes | ................ | B62D 33/0625 135/88.01 |

(Continued)

FOREIGN PATENT DOCUMENTS

CN 201339888 Y 11/2009

OTHER PUBLICATIONS

The International Search Report and the Written Opinion of the International Searching Authority issued in counterpart application No. PCT/US2016/036150, dated Aug. 30, 2016 (6 pages).

(Continued)

*Primary Examiner* — Jason S Daniels (57) ABSTRACT

A vehicle canopy comprises a stationary support bar that has substantially vertical base sections, tilted vertical sections tilted at an angle with respect to the respective base sections. A horizontal section extends between the tilted vertical sections. The horizontal section or the stationary support bar has a first peak height. A set of subsidiary stationary support bars is connected to the vertical base sections of the stationary support bar. The subsidiary stationary support bar has a second peak height less than the first peak height. A first support member has a set of mounting plates mounted above corresponding vertical base sections of the stationary support bar for supporting the first support member. A set of mounting flanges is on the subsidiary stationary supports. A second support member is supported by the mounting flanges.

11 Claims, 8 Drawing Sheets

(56) References Cited

U.S. PATENT DOCUMENTS

| | | | |
|---|---|---|---|
| 6,113,047 | A | 9/2000 | Wung et al. |
| 6,125,782 | A | 10/2000 | Takashima et al. |
| 6,129,321 | A | 10/2000 | Minelli et al. |
| 6,619,627 | B2 | 9/2003 | Salisbury et al. |
| 7,905,456 | B2 | 3/2011 | Gough |
| 7,927,076 | B1 | 4/2011 | Bucher et al. |
| 8,348,112 | B2 | 1/2013 | Becker |
| 2002/0096908 | A1 | 7/2002 | Tyrer et al. |
| 2004/0108429 | A1 | 6/2004 | Field et al. |
| 2005/0097836 | A1 | 5/2005 | Krovats |
| 2006/0266573 | A1 | 11/2006 | Ishii et al. |
| 2010/0025561 | A1 | 2/2010 | Becker |
| 2012/0305042 | A1 | 12/2012 | Lorbiecki et al. |
| 2014/0374564 | A1 | 12/2014 | Schroeder et al. |
| 2015/0136928 | A1 | 5/2015 | Fischer et al. |

OTHER PUBLICATIONS

The International Search Report and the Written Opinion of the International Searching Authority issued in counterpart application No. PCT/US2016/036152, dated Sep. 2, 2016 (6 pages).

The International Search Report and the Written Opinion of the International Searching Authority issued in counterpart application No. PCT/US2016/036155, dated Aug. 31, 2016 (6 pages).

\* cited by examiner

VEHICLE CANOPY

FIELD OF DISCLOSURE

This disclosure relates to a vehicle canopy.

BACKGROUND ART

In certain prior art, a bracket for mounting an electronic assembly can be time-consuming to remove the electronic assembly, to install the electronic assembly after its removal, or to adjust the position of the electronic assembly. Accordingly, there is need for a bracket that supports a quick-release mechanism for removal and installation of the electronic assembly and improved adjustment of its position in conjunction with a vehicle canopy.

SUMMARY

In accordance with one embodiment, a vehicle canopy comprises a stationary support bar that has substantially vertical base sections, tilted vertical sections tilted at an angle with respect to the respective base sections. A horizontal section extends between the tilted vertical sections. The horizontal section or the stationary support bar has a first peak height. A set of subsidiary stationary support bars is connected to the vertical base sections of the stationary support bar. The subsidiary stationary support bar has a second peak height less than the first peak height. A first support member has a set of mounting plates mounted above corresponding vertical base sections of the stationary support bar for supporting the first support member. A set of mounting flanges is on the subsidiary stationary supports. A second support member is supported by the mounting flanges. In another embodiment, a bracket for mounting an electronic assembly can be secured to the vehicle canopy, or its stationary support bar.

DETAILED DESCRIPTION OF THE EMBODIMENTS(S)

Figure 1:
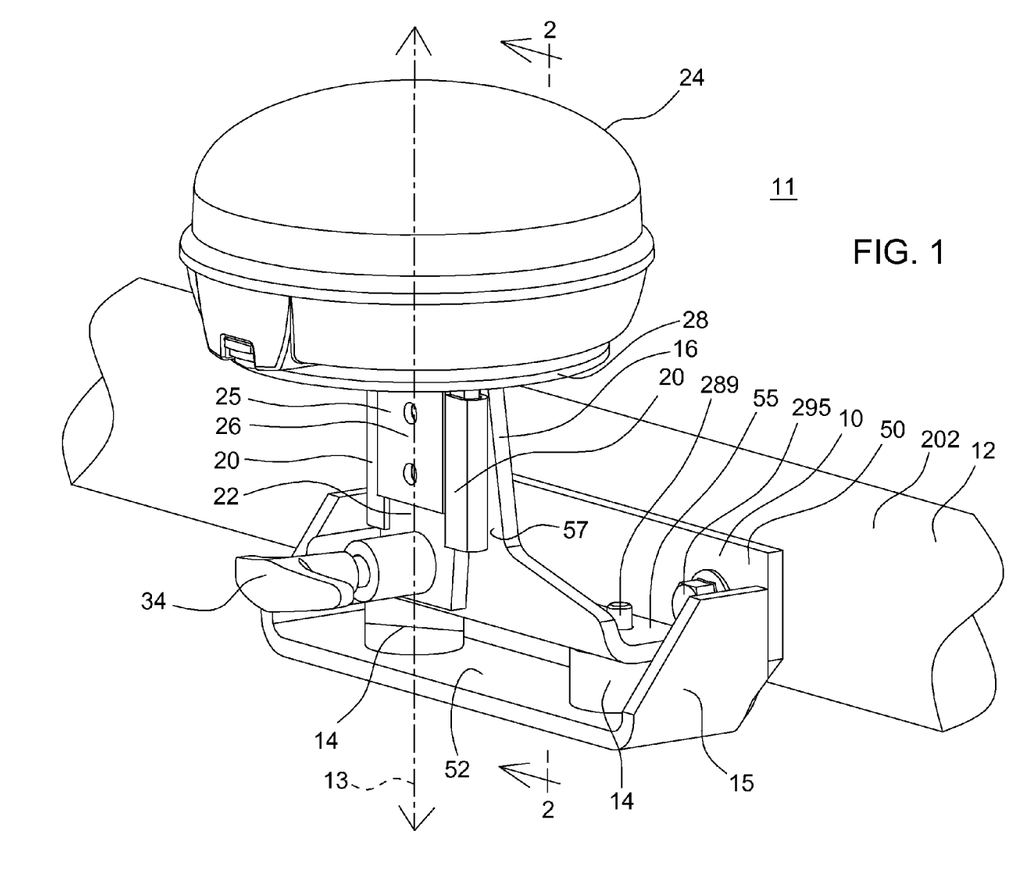
FIG. 1 is a perspective view of one embodiment of the bracket for mounting an electronic assembly.

In accordance with FIG. 1, a bracket 11 for mounting an electronic assembly 24 comprises a base bracket 10 for connection to a generally horizontal member 12 (e.g., horizontal structure) or stationary support bar 202 of a vehicle. As illustrated, the base bracket 10 is mounted to a stationary support bar 202 that comprises a generally hollow structure, such as a substantially tubular member. For example, the base bracket 10 may be attached to the generally horizontal member 12 or stationary support bar 202 via one or more fasteners, such as bolts 295 and nuts 297. The base bracket 10 has a set of holes for connection of the base bracket 10 to the generally horizontal member 12 or stationary support bar 202.

In one embodiment, the base bracket 10 comprises a generally orthogonal structure, although the base bracket can be generally planar to mount on a bottom or top of the horizontal member 12 or stationary support bar 202 of a vehicle. As shown for illustrative purposes, the base bracket 10 has a first surface 50 that forms a base angle (e.g., substantially orthogonal angle) to a second surface 52, where the first surface 50 and the second surface 52 are generally rectangular. The base angle may be selected such that a back member extends generally vertically or normally with respect to the ground on which a vehicle rests or moves. The first surface 50 has first bores for receiving the fasteners 295 for connection to the generally horizontal member 12 or stationary support. The second surface 52 has second bores for receiving secondary fasteners 289 to attach one or more isolators 14. Although the base bracket 10 has supporting side surfaces 15 as shown in FIG. 1 to add structural rigidity, the supporting side surfaces 15 are optional.

A back member 16 is coupled to the base bracket 10 by one or more isolators 14. In accordance with one embodiment, the isolator 14 is composed of an elastomeric material or a resilient material. Each isolator 14 may dampen vibrations, absorb shock or reduce vibrations that would otherwise be transmitted from the vehicle to the electronic assembly. In one configuration, the isolator 14 is composed of an elastomeric material or resilient material with a fastener, nut or threaded stud extending (partially or entirely) through a central portion of the elastomeric material or resilient material.

Figure 2A:
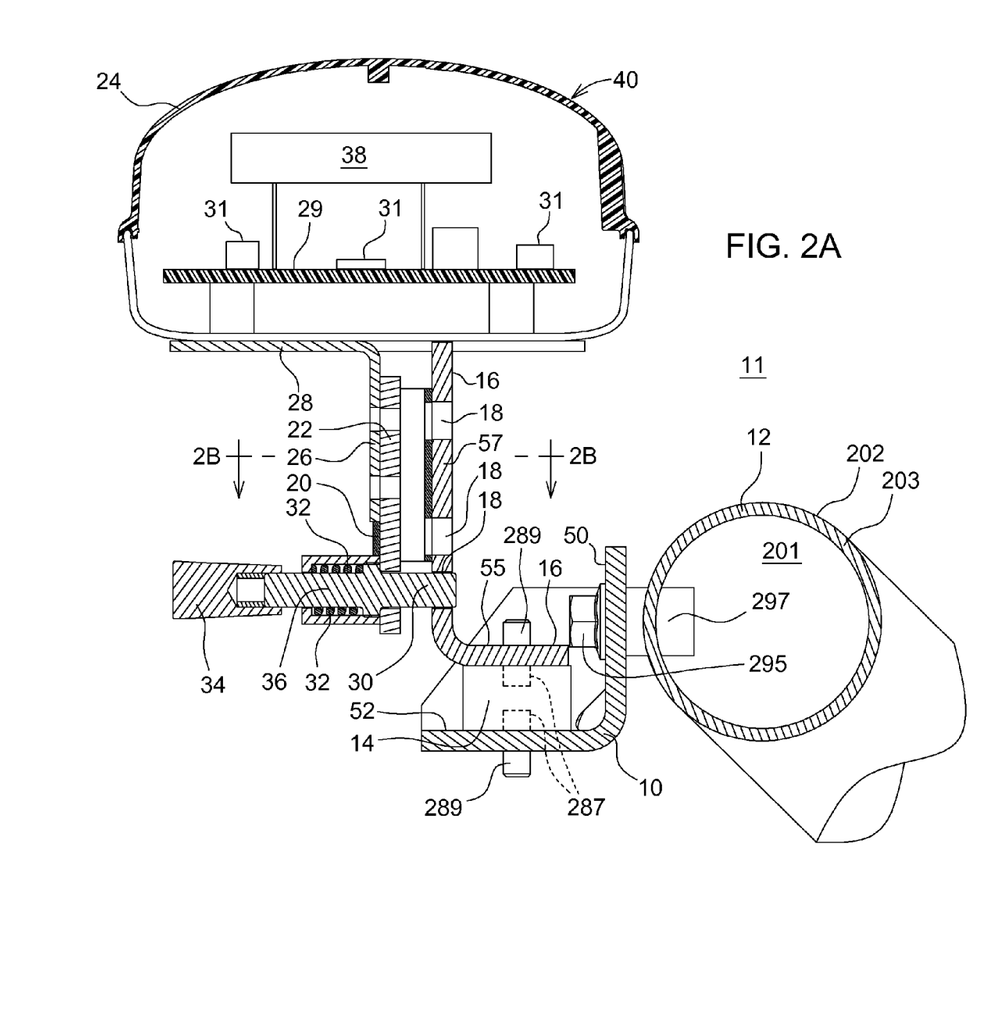
FIG. 2A is a cross section of FIG. 1 taken along reference line 2-2 of FIG. 1.

In an alternate configuration, such as that illustrated in FIG. 2A, the isolator 14 is composed of an elastomeric material (or resilient material) with fasteners, nuts (e.g., 287) or studs that extend partially into the elastomeric material or that are embedded in the elastomeric material (or resilient material), where the fasteners (e.g., 289) can extend from opposite sides of the elastomeric material (or resilient material) for connection to the base bracket 10.

In another alternate configuration, the isolator 14 may comprise a spring (e.g., coil spring) with one end secured to the base bracket 10 (e.g., at second surface 52) and an opposite end secured to back member 16 (e.g., at base portion 55).

The back member 16 or neck has a base portion 55 that is bent at a substantially orthogonal angle to a back portion 57, or at another suitable angle for mounting the electronic assembly 24 (e.g., satellite navigation receiver). The back portion 57 extends upwardly and generally vertically from the base portion 55. The back portion 57 may be tapered upwardly toward a flat peak, or have another suitable shape. The base portion 55 has secondary bores for receiving fasteners 289 for resiliently connecting (with vibration dampening) one or more isolators 14 between the base portion 55 and the base bracket 10, or the second surface 52 of the base bracket 10. The back member 16 or its back portion 57 has a set of first holes 18 or first adjustment holes arranged in generally vertical array.

A guide rail 20 (e.g., wedge bracket) or mounting rail is attached to the back member 16 or its back portion 57. For example, the guide rail 20 may form two generally parallel tracks with substantially rectangular cross-sections or U-shaped cross-sections for guiding a slidable member 22 (e.g., allowing vertical sliding of the slidable member 22 in the guide rail 20). The guide rail 20 may be cast, molded, welded, machined, pressed, bent or otherwise formed into an appropriate shape. As shown in FIG. 1, the guide rail 20 is a unitary structure, such as that illustrated in FIG. 2B, although it could be formed from two separate substantially parallel channels (e.g., 121 in FIG. 2C) that are attached to the back member 16 or its back portion 57. As used herein, the terms, guide rail or guide rails can be used interchangeably, although guide rail can refer to a guide rail with single channel, whereas guide rails can refer to a guide rail with one or more channels.

In an alternate embodiment, instead of having substantially parallel guide rails 20, the guide rail channels may be tapered or closer together toward a lower portion of the back member 16 than an upper portion of the back member 16. In the alternate embodiment, such tapered guide rails (that replace guide rail 20) may be adapted to receive a wedge-shaped slidable member 22, for example.

A slidable member 22 (e.g., a wedge member) is adapted for slidably engaging the guide rail 20 for one or more of the following: (1) for releasing the electronic assembly 24 from the bracket, or a portion thereof, or a vehicle, (2) for installing or removing the electronic assembly 24 from the bracket, or a portion thereof, or a vehicle, (3) for locking the electronic assembly 24 to the bracket, a portion thereof, or a vehicle, or (4) for a vertical adjustment of a height of the electronic assembly 24. In one embodiment, the slidable member 22 may be wedge-shaped or tapered (e.g., downwardly inward toward a central vertical axis 13 of the slidable member 22). For example, in an unlocked mode or released mode, the slidable member 22 can move upward or downward in the guide rail 20 with respect to the fixed or stationary back member 16 and guide rails 20. However, in a locked mode, the slidable member 22 is locked or fixed vertically in position along a vertical axis 13, and cannot move upward or downward in the guide rail 20 as will be described more fully below in this document.

A support member 26 comprises a shelf 28 for supporting the electronic assembly and a support portion 25 connected to the slidable member 22. The support portion 25 may comprise a stem 25 that extends downward from the shelf 28, or from a central region (e.g., center) of the shelf 28. The support portion 25 or stem may form a substantially orthogonal angle to the shelf 28. The shelf 28 may be connected to a housing or chassis of the electronic assembly 24 via an suitable means, such as adhesive, fasteners, hinged latches, or snap-fit connectors. For example, in one embodiment the shelf 28 is secured to a bottom of a housing of the electronic assembly 24. In certain embodiments, the electronic assembly 24 may comprise a location-determining receiver, a satellite navigation receiver, or a Global Positioning System (GPS) receiver for determining a position of the receiver.

The support member 26 has a support portion 25 with a first mating surface that is connected or coupled to a second mating surface of the slidable member 22, where the first mating surface faces the second mating surface. As shown, a first width or first dimension of the support member 26 is selected to have lesser dimension or lesser width than a second width or second dimension of the slidable member 22 that engages the guide rails 20. Accordingly, there can be a clearance between sides of the support portion 25 and the guide rail 20, or the support portion 25 may contact or engage the guide rail 20.

In one embodiment, the mounting bracket 11 further comprises a key 30 or pin for inserting into one of the first holes 18 in the back member 16 and a second hole in the slidable member 22, where one of the first holes 18 and the second hole are aligned. If the key 30 or pin engages one of the first holes 18 and the second hole in the slidable member 22, the slidable member 22 is in a locked state or locked mode. However, if the key 30 or pin does not engage one of the first holes 18 and the second hole, the slidable member 22 is in an unlocked or released state or mode. In the locked mode, the slidable member 22 is locked or fixed in position; hence, the electronic assembly 24 is secured in a fixed or locked position with respect to the vehicle, except for any resilient biasing or vibration dampening for vehicle movement over the ground afforded by one or more isolators 14.

In one embodiment, in the locked mode, the key 30 is resiliently biased by a spring 32 or other resilient member to force the key 30 into one of the first holes 18 and the second hole. To enter the unlocked mode or released mode, a user needs to overcome the bias force by pulling outwardly on handle 34 to release the key 30 and change the height of the electronic assembly 24. The locked mode may be established at various vertical positions (e.g., one or more adjustable discrete positions, such as set at known measurement intervals along the substantially vertical axis with respect to ground or a vehicle) that are registered or aligned with the holes or array of alignment holes 18 in the back member 16.

FIG. 2A is a cross section of FIG. 1 taken along reference line 2-2 of FIG. 1. Like reference numbers in FIG. 1 and FIG. 2A indicate like elements. FIG. 2A further illustrates, a spring 32 as an example of resilient member that is compressed by a user pulling a handle 34 or knob outward from the mount 11 to remove the key 30 from an adjustment hole 18 and to place the slidable member 22 in an released or unlocked mode for removal or adjustment (vertically) of the electronic assembly 24. The handle 34 is mounted on shaft 36 which terminates in key 30 or pin. If the electronic assembly 24 is removed via the key 30 in the released or unlocked mode, the electronic assembly 24 is removed, as attached to the slidable member 22 and the support member 26.

To install the electronic assembly 24, the slidable member 22 is inserted into the guide rails 20; gravity tends to force the slidable member 22 vertically downward into the guide rails 20 to a locked position where the resiliently biased spring 32 urged or forces the key 30 or pin into the hole 18 or adjustment hole in the back member 16. Normally, the spring 32 or resilient member retains the key 30 in the adjustment hole 18 to maintain a locked mode or locked state of the mounting bracket 11 in the absence of user applying any force (e.g., outward pulling force) to the handle 34 or shaft 36.

FIG. 2A also better illustrates a cross section of the isolators 14 in which each isolator is composed of an elastomeric material with fasteners 289 or studs that extend partially into the elastomeric material and are embedded therein, where the fasteners 289 can extend from opposite sides of the elastomeric material.

The cross section of the electronic assembly 24 illustrates one possible configuration of a satellite navigation receiver with an antenna 38 located at or near a peak height of the electronic assembly under a radome or dielectric housing portion 40 to assure adequate or ample signal reception of one or more satellite signals from different satellite vehicles. The electronic assembly 24 may house one or more circuit boards 29 with electronic components, semiconductors, or other devices 31.

Figure 2B:
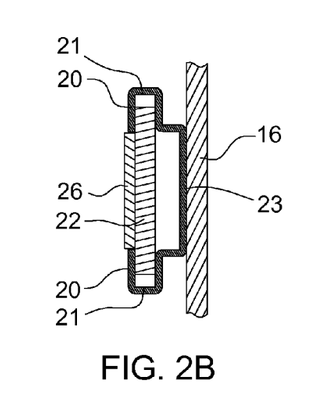
FIG. 2B is a cross section of FIG. 2A taken along reference line 2B-2B of FIG. 2A.

FIG. 2B is a cross section of a neck portion of FIG. 2A taken along reference line 2B-2B of FIG. 2A. Like reference numbers in FIG. 1, FIG. 2A and FIG. 2B indicate like elements. In FIG. 2B, the guide rail 20 is a unitary structure with tracks 21 and a supporting portion 23 that connects the tracks 21. Although the supporting portion 23 is illustrated with two generally orthogonal bends to add structural rigidity, in alternate embodiments the supporting portion may have a generally rectangular cross section or another suitable cross sectional shape. In one embodiment, the tracks 21 may comprise grooves with substantially rectangular cross sections or U-shaped cross sections. The guide rail 20 may be secured or attached to the back member 16. For example, the guide rail 20 may be secured or attached to the back member 16 via the supporting portion 23.

Figure 2C:
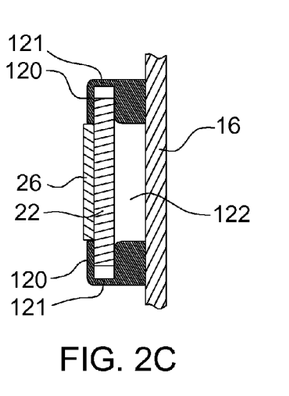
FIG. 2C is an alternate embodiment of a cross section of FIG. 2B.

FIG. 2C is an alternate embodiment of the cross section of FIG. 2B. Like reference numbers in FIG. 1, FIG. 2A, FIG. 2B and FIG. 2C indicate like elements. In FIG. 2C, the guide rail 120 comprises two generally parallel tracks 121 that are separated from each other by a hollow region 122 or air gap. In certain embodiments, the tracks 121 of the guide rail 120 are generally parallel to each other and slope downwardly toward each other. In one embodiment, the tracks 121 may comprise grooves with substantially rectangular cross sections or U-shaped cross sections. The guide rail 120 or its tracks 121 may be secured or attached to the back member 16.

Figure 3:
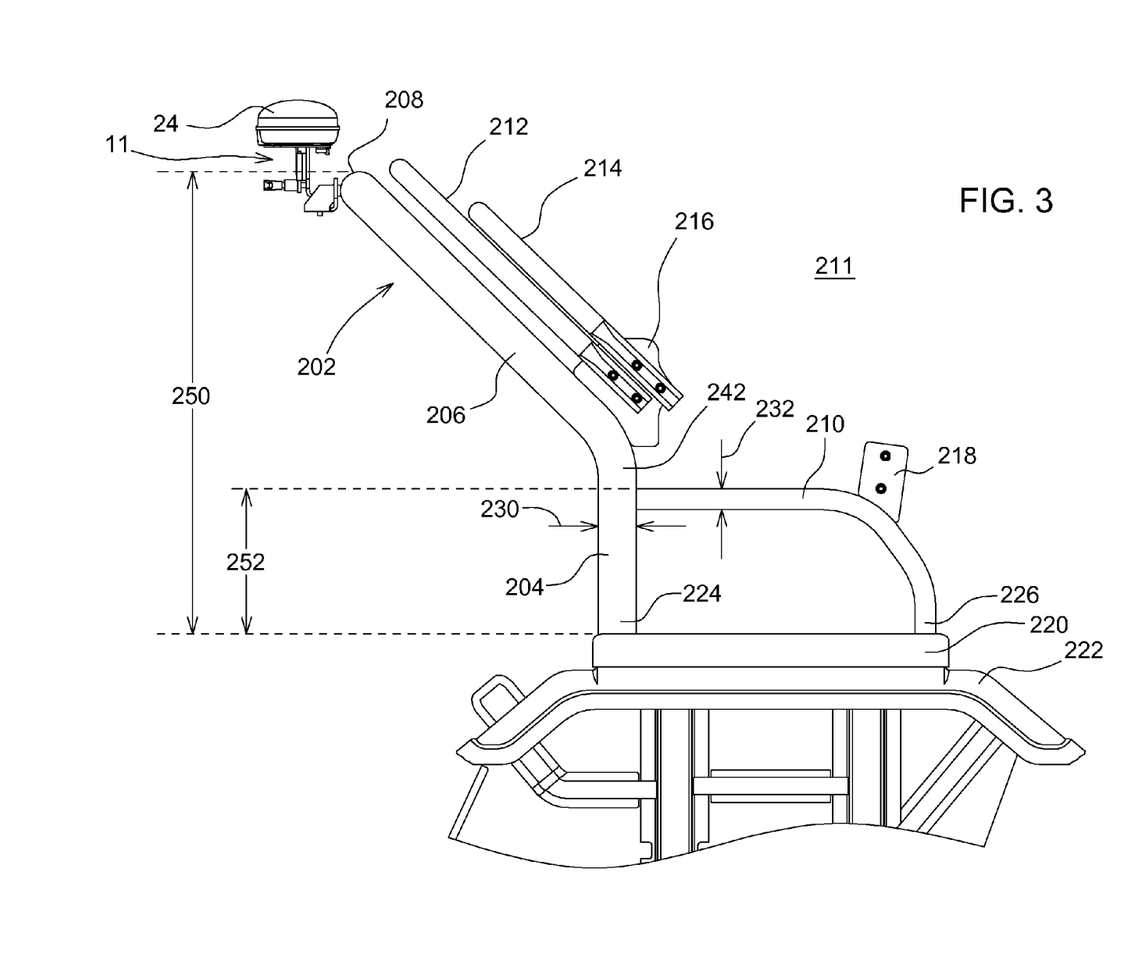
FIG. 3 is a side view of the bracket mounted on one embodiment of a canopy framework for a vehicle, where the canopy framework is in a folded or collapsed position.

FIG. 3 is a side view of the bracket mounted on one embodiment of a canopy or canopy framework 211 for a vehicle, where the canopy framework 211 is in a folded or collapsed position. In accordance with one embodiment, a stationary support bar 202 has substantially vertical base sections 204, tilted vertical sections 206 tilted at an angle with respect to the respective base sections 204, and a horizontal section 208 extending between the tilted vertical sections 206. The stationary support bar 202 may be integrally formed as unitary structure or may be formed of telescopically mating sections, interlocking mating sections, with or without retainers or fasteners. Accordingly, the vertical base sections 204, tilted vertical sections 206 and a horizontal section 208 may represent portions of the unitary structure or discrete telescopically mating sections.

The horizontal section 208 or the stationary support bar 202 has a first peak height 250 from the set of base flanges 220. A set of subsidiary stationary support bars 210 are connected to the vertical base sections 204 of the stationary support bar 202. Each subsidiary stationary support bar 210 has a second peak height 252 less than the first peak height 250.

A set of mounting plates 216 are mounted above corresponding vertical base sections 204 of the stationary support bar 202 for supporting a first support member 212, which is in a collapsed or folded position in FIG. 3. The first support member 212 may be configured as unitary structure, or may be formed of multiple sections. If the first support member 212 is unitary structure, the first support member 212 may comprise a member with substantially linear lower segments or portions with bends or corners that connect to an upper segment. If the first member 12 is formed of multiple sections, the foregoing lower segments and upper segment may be coupled together (e.g., telescopically) via corners or directly. However, in an alternate embodiment, the first support member 212 may comprise an arched member.

A set of mounting flanges 218 are mounted on the subsidiary stationary supports 210 for supporting the second support member 214. However, in the collapsed or folded position of the canopy structure, the second support member 214 may be temporarily and removably attached to the set of mounting plates 216. The second support member 214 may be configured as unitary structure, or may be formed of multiple sections. If the second support member 214 is unitary structure, the second support member 214 may comprise a member with substantially linear lower segments or portions with bends or corners that connect to an upper segment. If the second member 214 is formed of multiple sections, the foregoing lower segments and upper segment may be coupled together (e.g., telescopically) via corners or directly.

In an alternate embodiment, the second support member 214 may comprise an arched member.

As illustrated in FIG. 3, the folded or collapsed position facilitates connection of the first support member 212 and the second support member 214 to the set of mounting plates 216 via a set of fasteners (e.g., bolts and nuts). The folded or collapsed position is well-suited for shipping the canopy structure or a vehicle on which the canopy structure is installed.

The first support member 212 is foldable or collapsible because the first support member 212 is pivotable at a mounting plate, or the second support member 214 is pivotable as the mounting flange 218, or both the first support member 212 and the second support member 214 are pivotable at the mounting plate 216. As illustrated, the set of mounting plates 216 is positioned at a transition region 242 of the stationary support bar 202, the transition region 242 between the substantially vertical base sections 204 and tilted vertical sections 206. The mounting plate may be positioned at other points on the support bar outside of the transition region 242.

Figure 4:
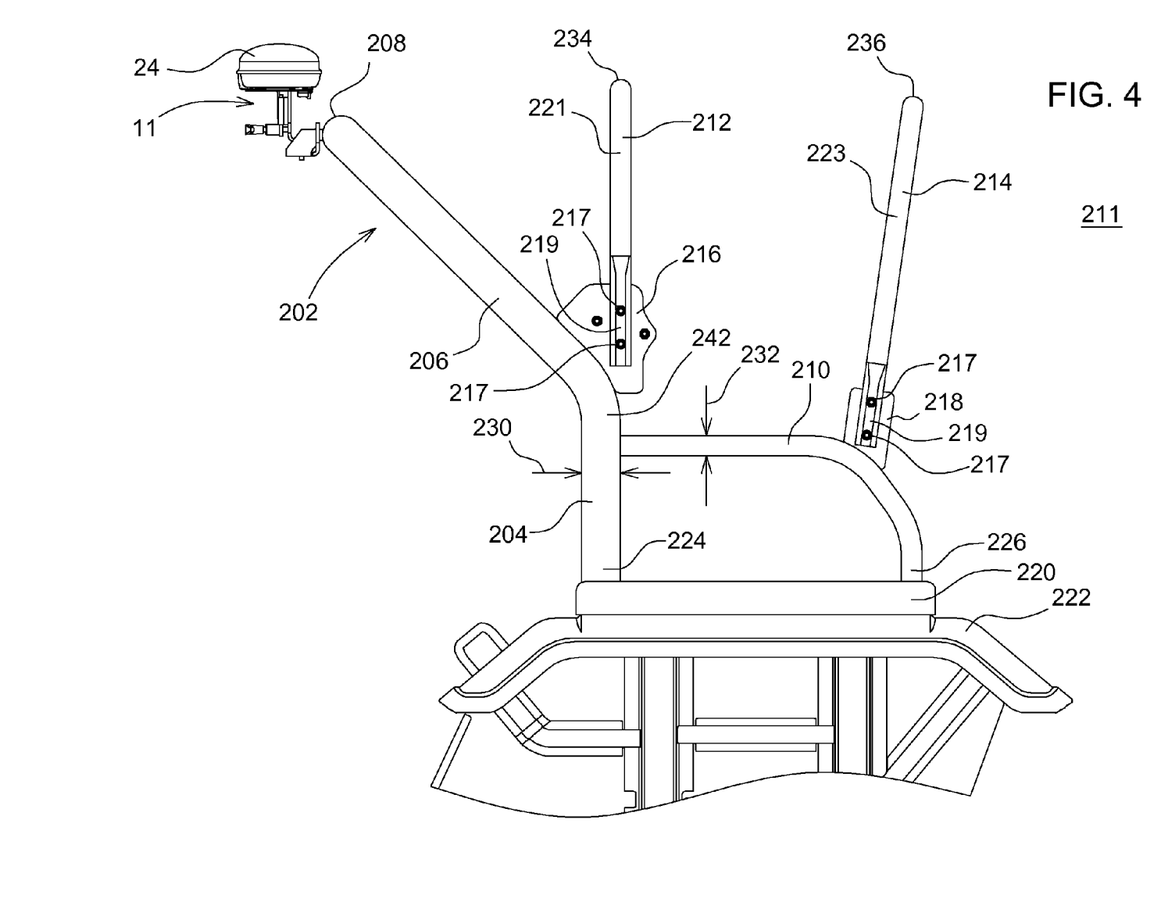
FIG. 4 is a side view of the bracket mounted on one embodiment of a canopy framework, where the canopy framework is in an extended position.

In contrast to FIG. 3, FIG. 4 illustrates the extended or installed position of the canopy structure 211. Here, the first support member 212 is mounted to the set of mounting plates 216 via fasteners 217. Meanwhile, the second support member 214 is mounted to the set of mounting flanges 218 via fasteners 217.

In one embodiment, if the first support is formed of sections, the first support member 212 has lower sections that are connected by a top section. Similarly, if the second support is formed of sections, the second support member 214 has lower sections that are connected by a top section. The lower sections may telescopically engage or interlockingly mate with the top section, for example. The first support member 212 and the second support member 214 may have hollow cross sections that are substantially tubular, rectangular, triangular, or polygonal, for instance.

Each lower section or portion of the first support member 212 may comprise a mounting section 219 with a matching or generally planar mating surface for mounting to the mounting plates 216 and mounting flanges 218. Likewise, each lower section or portion of the second support may comprise a mounting section 219 with a matching or generally planar mating surface for mounting to the mounting plates 216 and mounting flanges 218. The mounting section 219 with a matching or generally planar mating surface can be formed by extruding, molding, compressing, or otherwise forming the mounting section 219 as a rectangular bar or strip member with holes.

In an alternate embodiment, the hollow cross sections may be replaced with orthogonal support members.

A set of base flanges 220 is adapted for connection to lower ends 224 of the stationary support 202 and lower ends 226 of subsidiary stationary support 210. Each base flange 220 is capable of being secured to a vehicle structure 222 (e.g., frame, unibody structure, fender or body part) via fasteners. In one embodiment, each base flange 220 comprises a member with a substantially orthogonal cross-section, although a bar or planar member may be used in alternate embodiments.

In one embodiment, the stationary support bar 202, the subsidiary stationary support 210, the first support member 212, the second support member 214 have hollow cross-sections that are substantially circular 203, substantially elliptical, substantially rectangular, or substantially polygonal. In some cases, the In another embodiment, any of the stationary support bar 202, the subsidiary stationary supports, the first support member 212 and the second support member 214. The stationary support bar 202 may have substantially orthogonal cross sections 201.

In one embodiment, the stationary support bar 202 has a first cross-sectional dimension 230 and the subsidiary stationary supports have a second cross-sectional dimension 232 that is less than the first cross-sectional dimension 230. The first support member 212 has first supporting sections 212 that support a first horizontal section 234. The second support member 214 has second supporting sections 223 that support a second horizontal section 236.

Figure 5:
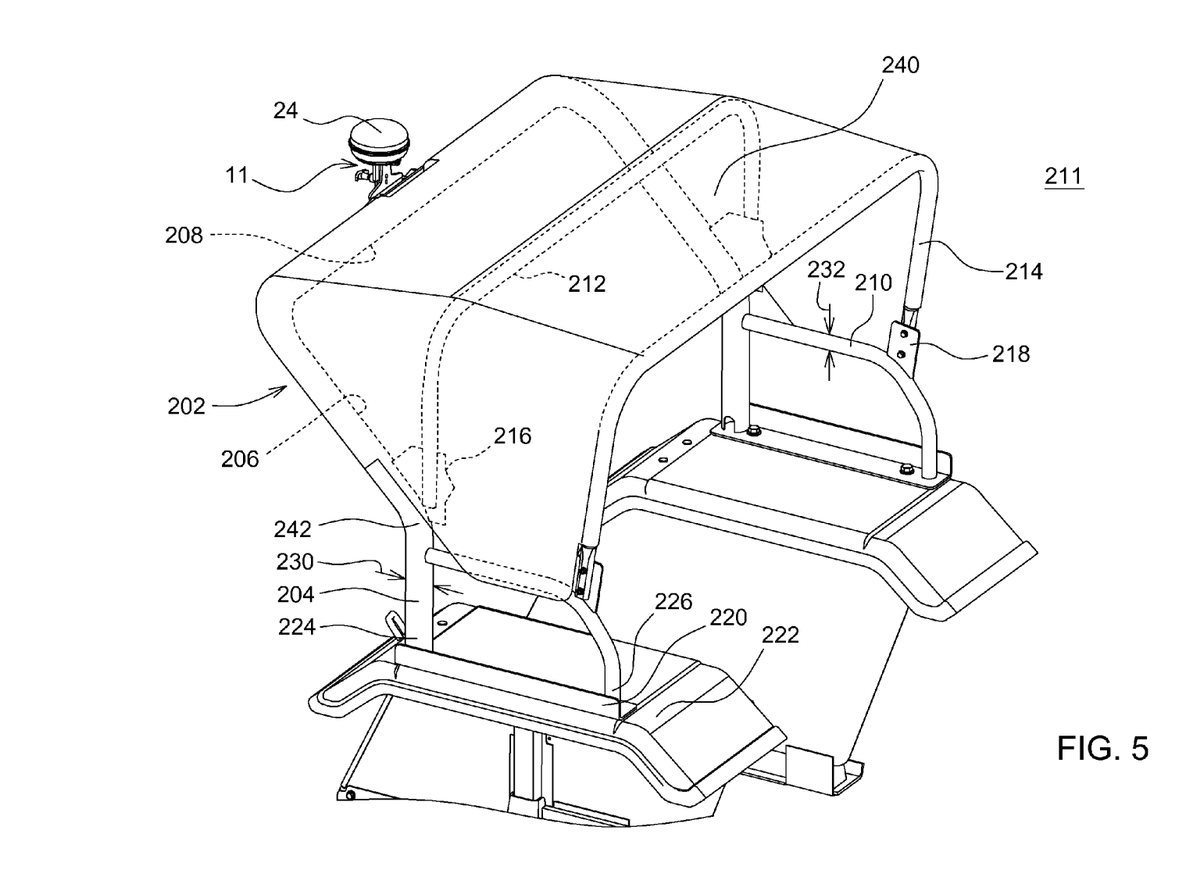
FIG. 5 is a perspective view of the canopy framework, further illustrating a canopy fabric or material covering at least part of the canopy framework.

As illustrated in FIG. 5, the stationary support bar 202, the first support member 212 and the second support member 214 support fabric or material 240 or are covered, at least partially, with fabric or material 240 to form the canopy.

Referring to FIG. 3 through FIG. 5, inclusive, the stationary support bar 202 has a mounting bracket 11 for accepting an electronic assembly or a satellite navigation receiver. The electronic assembly 24 is mounted on the stationary support bar 202 via the mounted bracket is isolated from vibration of the vehicle.

Figures 6A, 6B, 6C:
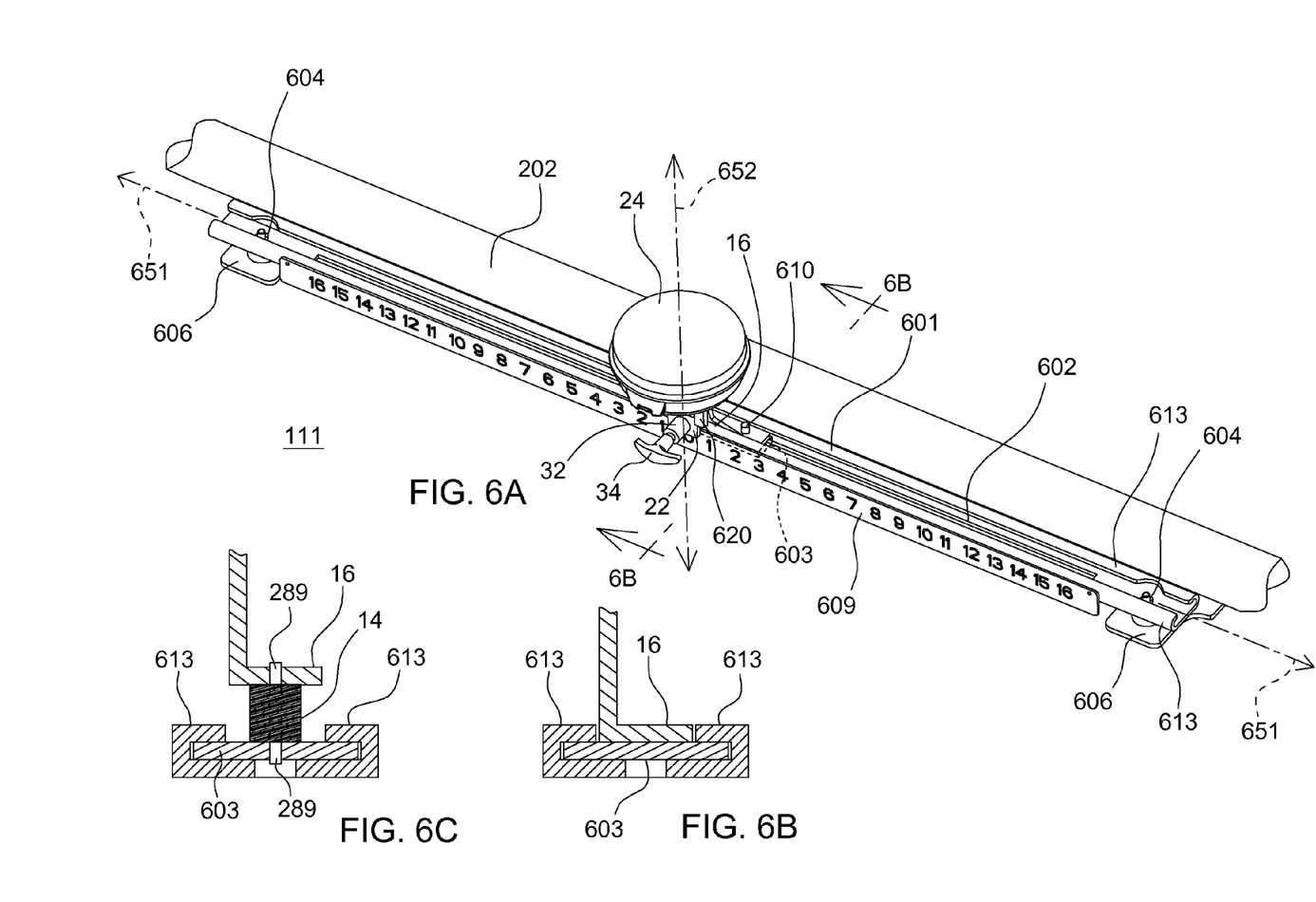
FIG. 6A is a perspective view of an alternate embodiment of a mounting bracket that is movable or slidable along a lateral mounting rail.
FIG. 6B is one embodiment of a cross section of a neck portion of the mounting bracket along reference line 6B-6B in FIG. 6A.
FIG. 6C is an alternate embodiment of a cross section of a neck portion of the mounting bracket along reference line 6B-6B in FIG. 6A.

FIG. 6A is a perspective view of an alternate embodiment of a mounting bracket 111 that is movable or slidable along a lateral mounting rail or first guide rail 601. The mounting bracket 111 of FIG. 6A has some components in common with the mounting bracket 11 of FIG. 1 and FIG. 2A. Like elements in FIG. 1, FIG. 2A and FIG. 6A indicate like elements.

A mounting bracket 111 for mounting an electronic assembly 24 comprises a first guide rail 601, a base member 603, and a back member 16. In one configuration, the first guide rail 601 is installed to extend substantially laterally on the vehicle, which is generally perpendicular to a direction of travel of the vehicle. The first guide rail 601 is secured to the vehicle or vehicle structure, such as stationary support bar 202. In one example, the first guide rail 601 can be secured to the stationary support bar 202 (e.g., a tubular structure) via one or more clamps. In another example, the first guide rail 601 is secured to the stationary support bar 202, a tubular structure or another vehicle structure via a vehicle bracket 606 and a fastener 604.

The first guide rail 601 has a central slot or central opening 602. The central opening 602 may comprise a slot or aperture that runs along a lateral length or lateral axis 651 of the mounting bracket 111 or the first guide rail 601. In one embodiment, the first guide rail 601 has a pair of channels 613 along its edge, where each channel has a generally U-shaped cross-section, a substantially rectangular cross-section, or a slot-shaped cross section for retaining (slidably or securely) the base member 603 within the channel or slot. Although not required, the first guide rail 20 can have or support a ruler or a measurement index 609 or gauge (e.g., adhesive label ruler) to align the lateral position of the electronic assembly 24 with respect to the vehicle. The measurement index 609 is well suited for calibrating or adjusting the relative position of an antenna 38 (along the lateral axis 651) of the electronic assembly 24 (e.g., location determining receiver or satellite navigation receiver) with respect to the vehicle, its vehicle body, its wheels or its ground-engaging tracks. Meanwhile, the back member 16 has an array of vertically aligned holes or bores 18 that cooperatively engage/disengage the key 30 to allow the height of an antenna 38 of the electronic assembly 24 to be adjusted (at one or more discrete height settings) along a vertical axis with respect to the ground or the vehicle. Thus, the mounting bracket 111 of FIG. 6A can support adjustment in two mutually orthogonal directions, or along the vertical axis and horizontal axis, independently.

In one embodiment, the base member 603 is connected to the lower portion of the back member 16. The base member 603 is slidable along the first guide rail 601 until secured by one or more fasteners 610 that extend though the base member and the central opening 602. The base member 603 may comprise a generally planar strip, a polyhedron, a rectangular member or polygonal member. As illustrated, the fasteners 610 may comprise bolts or studs and nuts 608 (e.g., wing nuts in FIG. 7).

FIG. 6B illustrates a cross section along reference line 6B-6B of FIG. 6A. In the embodiment of FIG. 6B, the back member 16 is coupled to the base member 603 directly in physical contact. However, in the alternate embodiment of FIG. 6C, the back member 16 is coupled, indirectly, to the base member 603 via one or more isolators 14. The alternate embodiment of FIG. 6C also provides an illustrative example of the cross-section along reference line 6B-6B of FIG. 6A. If used, the isolator 14 is composed of an elastomeric material or resilient material. The isolator 14 is composed of an elastomeric material with one or more fasteners, nuts or threaded stud (e.g., 289) embedded in the elastomeric material.

A second guide rail 620 is attached to the back member 16. The second guide rail 620 of FIG. 6A is analogous to or the equivalent of the guide rail of FIG. 1. The second guide rail 620 slidably retains a slidable member 22 that can be moved or slid in a released or unlocked mode. The back member 16 has a plurality of first holes 18 arranged in generally vertical array. The key 30 or pin engages one of the first holes 18 in the locked mode and is disengaged from all of the holes 18 in the released mode or unlocked mode. In one embodiment, a key 30 or pin is used for inserting into one of the first holes 18 and a second hole in the slidable member 22. The key 30 or is resiliently biased by a spring 32 or other resilient member to force the key 30 into one of the first holes 18 and the second hole. In a released or unlocked mode, the user needs to overcome the bias force by pulling on handle 34 to release the key 30 and change the height of the electronic assembly 24.

In an alternate embodiment, the second guide rail 620 is replaced by two channels for retaining the slidable member 22, where the two channels are substantially parallel or slightly sloped inwardly and downwardly toward a lower portion of the back member 16.

A slidable member 22 (e.g., wedge shaped slidable member 22, with the wedge aimed downward) is arranged for slidably engaging the second guide rail 620. In a released or unlocked mode, the slidable member 22 can slide vertically upward or downward in or with respect to the second guide rail 620. In the released or unlocked mode, the vertical height of the electronic assembly 24 can be adjusted by different detents or holes 18 in the back member 16. However, in a locked mode, the slidable member 22 is locked or secured in a vertical position along a vertical axis 652 with respect to the guide rail 620 and the back member 16.

A support member 26 comprises a shelf 28 for supporting the electronic assembly 24 and a support portion connected to the slidable member 22.

The shelf 28 is secured to a bottom of a housing of the electronic assembly 24. In a released mode or state, the electronic assembly 24 can be removed from the mount 111 or its vehicle along with the attached shelf 28 and stem.

Figures 6D, 6E:
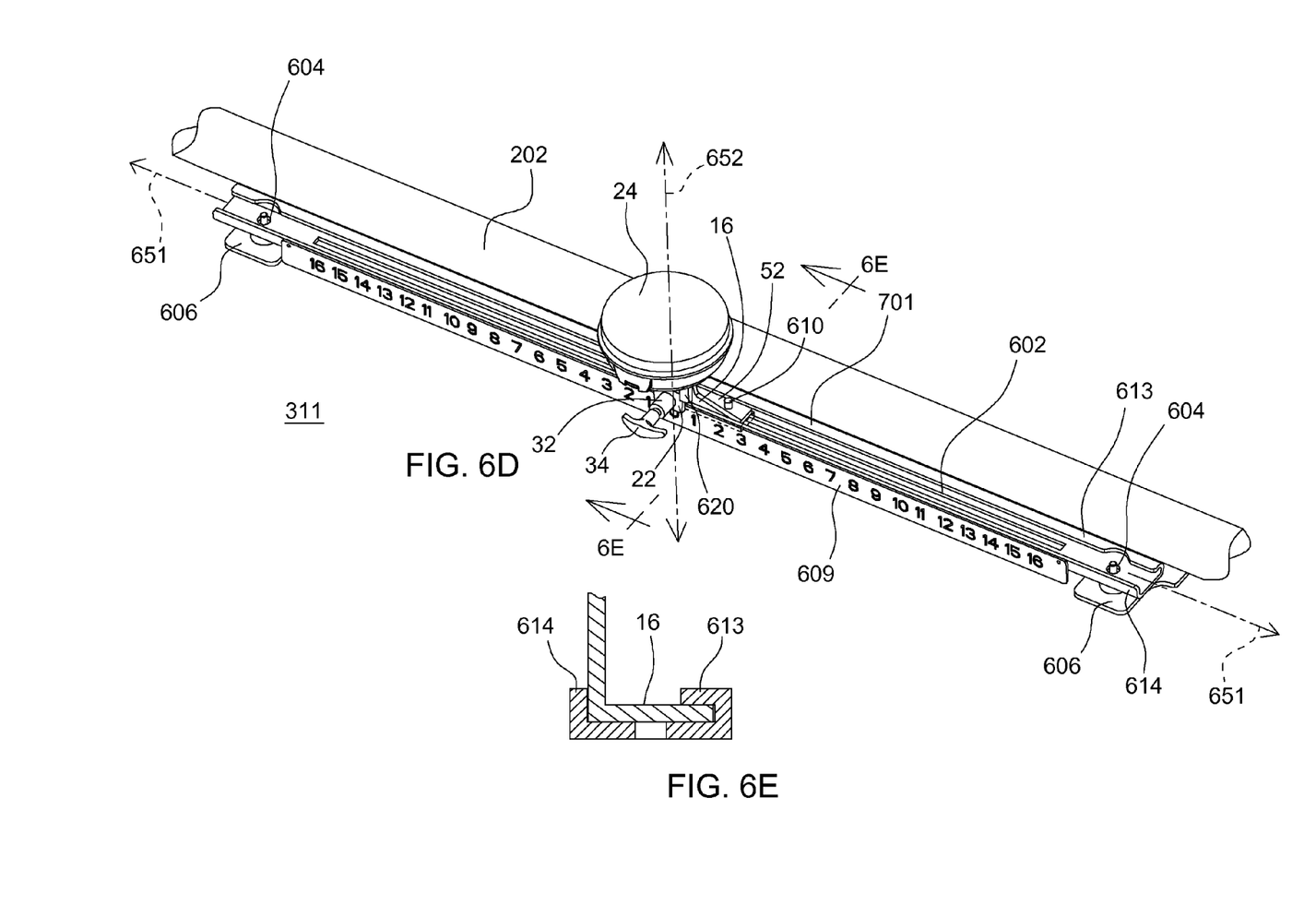
FIG. 6D is a perspective view of an alternate embodiment of a mounting bracket that is moveable or slidable along a lateral mounting rail.
FIG. 6E is a cross section of a neck portion of the mounting bracket along reference line 6E-6E in FIG. 6D.

FIG. 6D is a perspective view of an alternate embodiment of a mounting bracket 311 that is movable or slidable along a lateral mounting rail or first guide rail 601. The mounting bracket 311 of FIG. 6D has some components in common with the mounting bracket 111 of FIG. 6A. Like elements in FIG. 1, FIG. 2A, FIG. 6A through 6E, inclusive, indicate like elements. The mounting bracket 311 of FIG. 6D is similar to that of FIG. 6A except the base member 603 is deleted and a channel 614 replaces one of the channels 613.

As illustrated in FIG. 6D, the first guide rail 701 has a channels (613, 614) along its edge. Channel 613 has a generally U-shaped cross-section, a substantially rectangular cross-section, or a slot-shaped cross section for retaining (e.g., slidably or securely) the back member 16 within the channel or slot. In contrast, channel 614 has a substantially orthogonal cross-section or an L-shaped cross-section for retaining or guiding the back member 16. The cross-section of channel 614 accommodates movement of the back member 16 (to avoid mechanical interference with its upward extending neck) without any base member 603. In one embodiment, a lower portion or second surface 52 of the back member 16 is slidable along the first guide rail 601 until secured by one or more fasteners 610 that extend though a lower portion or second surface 52 of the back member 16 and the central opening 602. As illustrated, the fasteners 610 may comprise bolts or studs and nuts 608 (e.g., wing nuts in FIG. 7).

Figure 7:
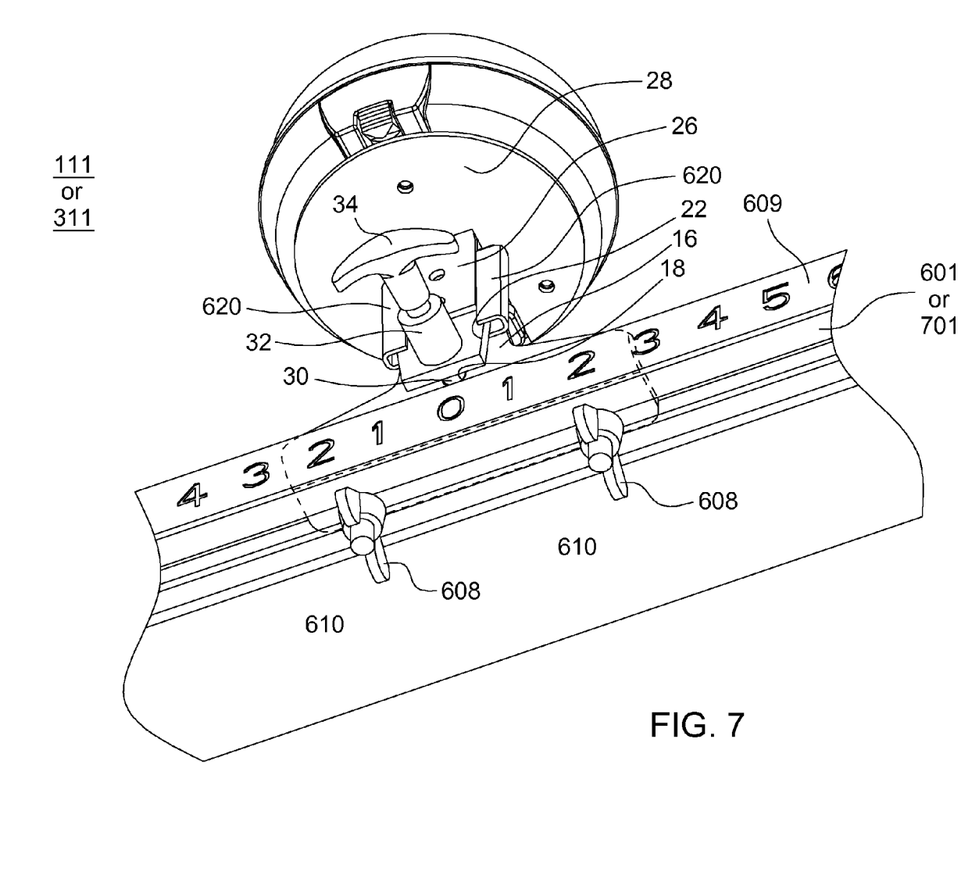
FIG. 7 is another perspective view of an the alternate embodiment of FIG. 7.

FIG. 7 is another perspective view of any of the embodiments of FIG. 6A or FIG. 6D. FIG. 7 better illustrates a bottom perspective view of the first guide rail 601, along with the fasteners 608 (e.g., wing nuts) to secure the lateral alignment of the electronic assembly 24. The lateral alignment along the lateral axis 651 can precisely define the position of an antenna 38 of the electronic assembly 24 or satellite navigation receiver to the vehicle to support or facilitate estimation of accurate and precise location data for the vehicle.

Having described on or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The following is claimed:

1. A vehicle canopy comprising:
    a stationary support bar having substantially vertical base sections, tilted vertical sections tilted at an angle with respect to the respective base sections, and a horizontal section extending between the tilted vertical sections, the horizontal section or the stationary support bar having a first peak height;
    a set of subsidiary stationary support bars connected to the vertical base sections of the stationary support bar, the subsidiary stationary support bar having a second peak height less than the first peak height;
    a first support member;
    a set of mounting plates mounted above corresponding vertical base sections of the stationary support bar for supporting the first support member;
    a set of mounting flanges on the subsidiary stationary supports; and
    a second support member supported by the mounting flanges.

2. The vehicle canopy according to claim 1 further comprising:
    a plurality of base flanges for connection to lower ends of the stationary support and lower ends of subsidiary stationary support, the base flange capable of being secured to a vehicle structure via fasteners.

3. The vehicle canopy according to claim 1 wherein the base flange comprises a member with a cross-section having two substantially orthogonal portions.

4. The vehicle canopy according to claim 1 wherein the stationary support bar, the subsidiary stationary supports, the first support member, the second support member have hollow cross-sections that are substantially circular, substantially elliptical, substantially rectangular, or substantially polygonal.

5. The vehicle canopy according to claim 1 wherein the stationary support bar has a first cross-sectional dimension and wherein the subsidiary stationary supports have a second cross-sectional dimension that is less than the first cross-sectional dimension.

6. The vehicle canopy according to claim 1 wherein the first support member has first supporting sections that support a first horizontal section and wherein the second support member has second supporting sections that support a second horizontal section.

7. The vehicle canopy according to claim 1 wherein the stationary support bar, the first support member and the second support member support fabric or material to form the canopy.

8. The vehicle canopy according to claim 1 wherein the stationary support bar has a mounting bracket for accepting an electronic assembly or a satellite navigation receiver.

9. The vehicle canopy according to claim 8 wherein the electronic assembly mounted on the stationary support bar via the mounted bracket is isolated from vibration of the vehicle.

10. The vehicle canopy according to claim 1 wherein the first support member is foldable or collapsible because the first support member is pivotable at the first mounting plate.

11. The vehicle canopy according to claim 1 wherein the set of mounting plates is positioned at a transition region of the stationary support bar, the transition region between the substantially vertical base sections and tilted vertical sections.

* * * * *